March 12, 1929.                J. F. MAZZA                1,705,331
                        CEMENT BRICK STAMPING DEVICE
                            Filed May 16, 1927
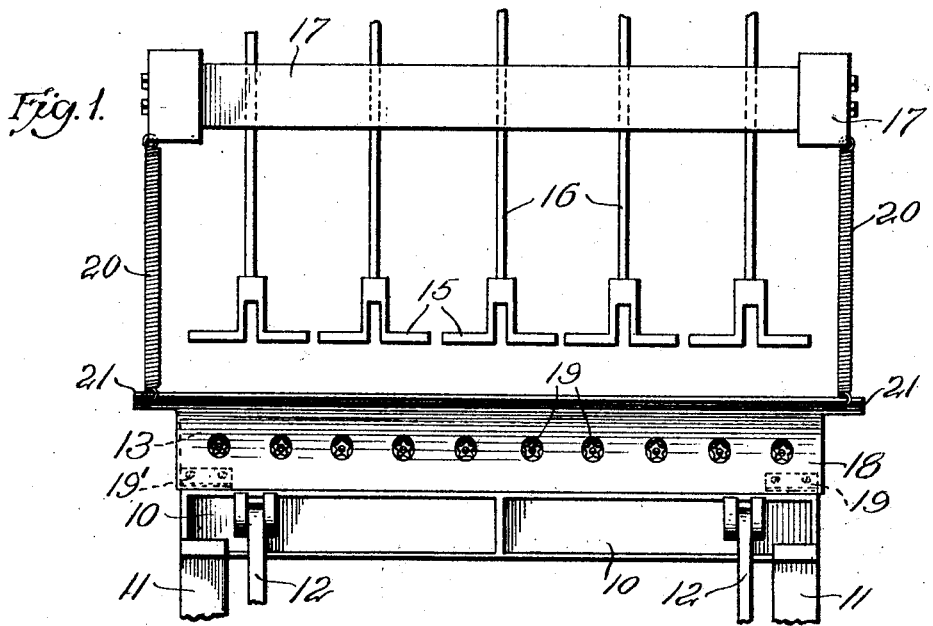
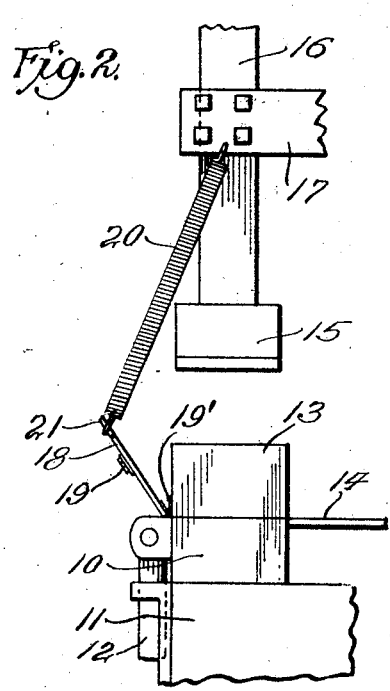
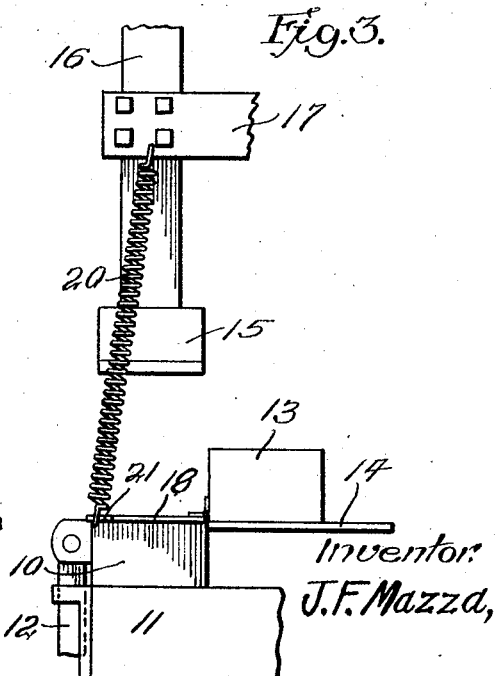
Inventor:
J. F. Mazza,
By Mawhinney & Mawhinney
                Attys.

Patented Mar. 12, 1929.

1,705,331

UNITED STATES PATENT OFFICE.

JOSEPH F. MAZZA, OF CAMBRIDGE, MASSACHUSETTS.

CEMENT-BRICK-STAMPING DEVICE.

Application filed May 16, 1927. Serial No. 191,759.

The present invention relates to an attachment for application to brick or block molding machines, and has for an object to provide an attachment by use of which the molded bricks, while still in the molds may be impressed with the trademark, name or the like of the manufacturer.

An object of the present invention is to provide a device, which may be easily operated upon the bricks before they are removed from the mold, and without interfering with the operation of the brick molding machine, and also without the necessity of performing a number of various operations for applying the trademark, and which tend to destroy or injure the bricks.

Another object of the invention is to provide a stamping or marking device of this character which may be used for impressing a plurality of bricks simultaneously, and which is always in position for application to the bricks immediately the bricks are molded and about to be discharged from the brick making machine.

The invention also aims at a device, which may be brought into operation at a suitable time during the making of the bricks, by either manually, automatically or otherwise actuating the device to bring it into contact with the freshly molded bricks, while in the molds and wherein the device will be automatically moved into position out of the way, so that the molded and impressed bricks may be removed from the machine and the machine carry on its operations without interference or delay.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary front elevation of a brick molding machine having the cement brick stamping device applied thereto and in raised position out of the way, Figure 2 is a fragmentary side elevation of the same, and in the same position out of the way, and Figure 3 is a like view showing the stamping device in operative position and with the molding machine adjusted ready to discharge a supply of freshly molded bricks.

Referring to the drawing, 10 designates a mold, which may be of any suitable size and contain any number of compartments, such as is common in the multiple brick molding machines, which are now commonly used.

The mold 10 is supported upon standards 11 or the like which form a part of the machine and is held and adjusted in proper position by the bars or links 12 in the ordinary manner. Above the mold 10 is disposed a material hopper 13 adapted to be shifted horizontally back and forth from a position immediately over the mold 10, as shown in Figure 2 into a rear position on the guide 14. When in the rearmost position the material hopper 13 frees the mold 10, so that the bricks therein may be discharged upon a pallet and removed from the brick machine.

In vertical alinement with the mold 10, and registering with the various compartments which may be formed in the mold 10, is a plurality of plungers 15 adapted to operate upon the material and compress the same in the mold 10 to form the bricks. These plungers 15 are mounted on plunger rods or bars 16 suitably supported in the super-structure of the frame 17.

When the material hopper 13 is shifted backwardly, the upper side of the mold 10 is exposed, so that the molded bricks therein are exposed through the upper side of the mold 10. Advantage is taken of this operation of the machine, so as to stamp or impress these freshly molded bricks while still in the mold, so that stamping pressure exerted upon the bricks will not tend to distort, destroy or otherwise injure the bricks. To this end, the material hopper 13 is used as a carrier for a stamping plate 18, which is hinged along one edge by hinges 19' to the lower front edge of the material hopper 13. The hinges 19' may be of any suitable type and number to connect the stamping plate 18 to the material hopper, so that the plate may be swung up and down into raised and lowered positions, and at the same time will be carried back and forth with the material hopper. The plate 18 is of such dimensions that when the material hopper 13 is moved into a rear position, the plate 18 will overlie and substantially cover the top of the mold 10. A plurality of dies 19 of the projecting type are mounted upon the under side of the plate 18 opposite each compartment in the mold 10 and projects sufficiently to engage in the upper faces of the bricks which are in the mold when the plate 18 is forced downwardly over the open top of the mold. The stamping plate 18 is normally held in the raised position, as shown in Figures 1 and 2, by one or more springs 20. In the present instance a spring 20 is connected at its lower end to each end of the plate 18, and the plate 18 has a projecting lug 21 at each end and near its free edge to receive the lower end of the spring 20. The upper ends of the springs 20 are suitably connected to the frame 17 or super-structure of the brick making machine. It is apparent that the plate 18 may be swung downwardly by hand or by any other suitable means, either automatically or otherwise at the proper time during the operation of the brick making machine, so that the mold is first filled, the block compressed in the compartments of the molds, and the material hopper moved out of the way to expose the freshly molded bricks through the top of the mold.

At this point in the operation of the machine the plate 18 is operated upon to swing the plate 18 downwardly and force the projecting dies 19 into the upper surface of the freshly molded bricks. The mold 10 holds the bricks in proper shape during this impression.

The dies 19 may be of any suitable character to impress the name of the maker, his trademark, or any other suitable data or markings which it is desired to impress upon the bricks. It is apparent that one downward swinging of the plate 18 impresses the entire number of bricks which are contained in the mold 10. The projecting arms or lugs 21 at the ends of the plate 18 provide handles or the like by means of which the plate is forced downwardly by application of pressure to the arms 21, the springs 20 acting on the arms 21 to return the plate 18 into its normal raised position.

It is obvious that various changes and modifications may be made in the details of construction and design of the above specifically described embodiment of this invention without departing from the spirit thereof, such changes and modifications being restricted only by the scope of the following claims.

What is claimed is:—

1. A stamping device for application to brick making machines having a mold, a shiftable material hopper for movement into and from position over the mold, and a super-structure above the mold, comprising a plate hinged to the front of said material hopper for movement with the hopper to bring the plate into position over the mold when the hopper is removed from the mold, projecting dies carried upon the under side of said plate, and means for normally maintaining said plate in a raised position spaced from the mold, said plate adapted to be forced downwardly over said mold to embed said dies in the newly formed bricks in the mold.

2. A stamping device for application to brick molding machines having the usual mold and material hopper, a plate hinged to the forward edge of said hopper adapted to be shifted into position over the mold when the hopper is withdrawn therefrom, springs normally maintaining said plate in a raised position, and stamping dies mounted upon the under side of the plate for projection into the mold when the plate is lowered to impress newly molded bricks while still in the mold, said plate adapted to be moved downwardly when said hopper is removed from the mold.

3. A stamping device for application to brick making machines having a mold, a hopper for fitting material to the mold and movable into and out of position over the mold, and a super-structure above the hopper and the mold, a plate hinged along one edge to the lower edge of the hopper and movable into and out of position over the mold during the movement of the hopper into and out of position over the mold, springs carried by the super-structure and connected to the plate for normally maintaining the same in raised position out of contact with the mold and for shifting with the material hopper, said plate adapted to be forced downwardly into position over the mold when the plate is moved into registry with the mold, and projecting dies carried by the plate for impressing newly formed bricks while in the mold.

4. In combination with a brick making machine having a mold, a plunger, and a hopper shiftable into and out of position between the mold and plunger, a plate movably mounted on the hopper for movement into and out of position over the mold by the shifting of the hopper, and a die carried by said plate, said plate adapted to be moved against the mold for pressing the die in a brick in the mold when the plate registers with the mold.

In testimony whereof I affix my signature.

JOSEPH F. MAZZA.